Patented June 7, 1932

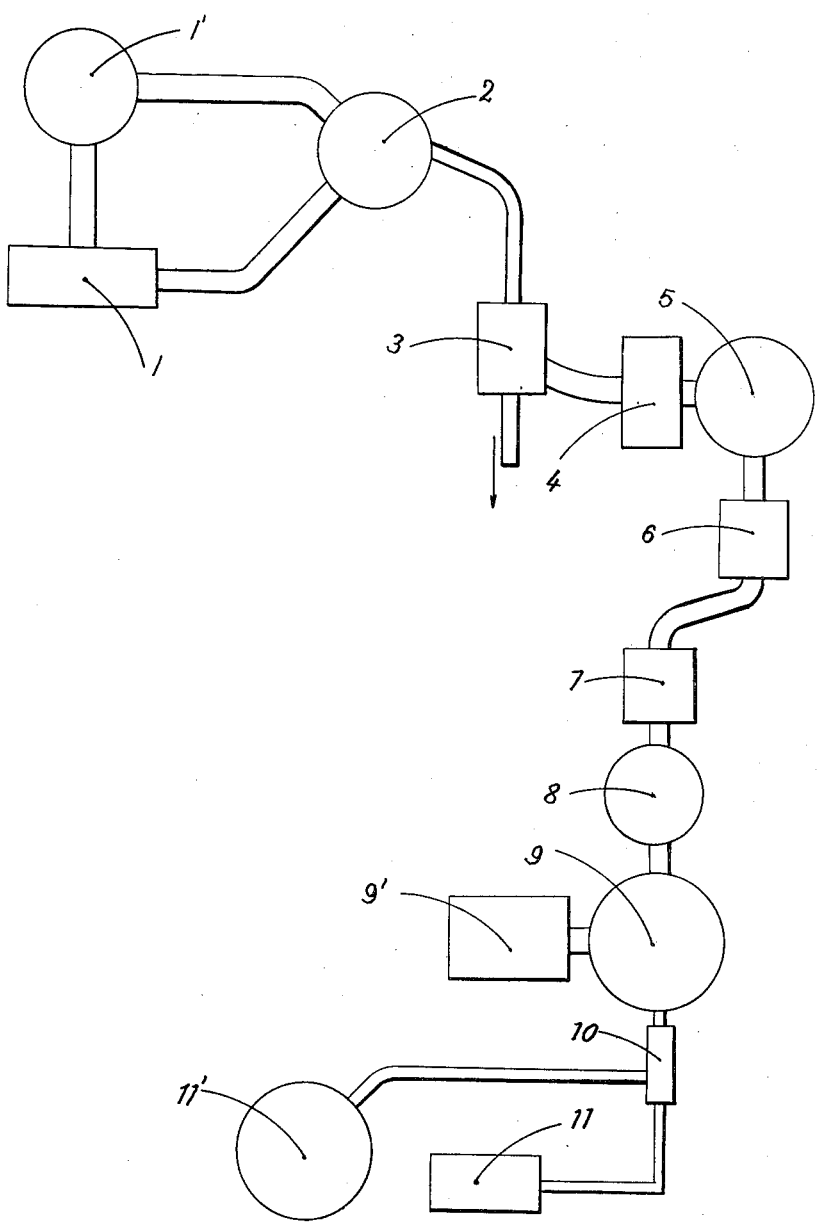

1,861,677

UNITED STATES PATENT OFFICE

LEVON ARAKEL AGOPIAN, OF PARIS, FRANCE

PROCESS FOR OBTAINING CONCENTRATED VITAMIN PREPARATIONS

Application filed March 1, 1927, Serial No. 171,881, and in France September 20, 1926.

The present invention has reference to a process enabling highly concentrated preparations of the vitamine A, also known as Vitasterol A, to be obtained industrially, said vitamine being the general factor of soluble growth in fats, that is to say an anti-xerophthalmic factor.

The process forming the subject matter of the invention utilizes principles set forth for the first time in U. S. Patent No. 1,468,251 filed the 29th August 1921.

The subject matter of the invention consists in the application of the method of operation mentioned above in order to obtain preparations of vitamine A, the richness of which in this principle may easily attain and even exceed if needs be ten thousand times that contained in the same volume of fresh cod liver oil. These preparations are free from the disagreeable taste and odour as well as from the noxious properties of cod liver oil. Cod liver oil is here cited as an example of a natural body, known universally as one of the richest in vitamine A (factor of soluble growth in fats).

It may be recalled that in the above mentioned U. S. patent it was foreseen that vitamines soluble in fats can be obtained parallel with vitamine C starting from the same vegetable basis. According to requirements the vitamine A may be obtained as a principal product and the vitamine C as a by-product of the manufacture; or inversely the vitamine C may become the principal product and the vitamine A the by-product. Finally the two vitamines may be obtained simultaneously in equal parts. In the first case use is made of a vegetable basis particularly rich in vitamine A, but nevertheless containing a notable quantity of vitamine C, for example the tomato (the fruit); in the second case recourse is had to a vegetable basis having the contrary properties such as the cabbage (the leaves); finally the process permits of the simultaneous use in the same manufacturing process of the two vegetables establishing the relationship that is desired between the outputs of vitamines A and C.

To enable the method of operation according to the invention to be accurately and precisely set forth there will be taken as an example the obtaining of preparations of vitamine A using tomatoes (the fruit) and cabbages (the leaves) as a basis. It is evident that the application of the process could be realized with all other vegetables rich in vitamines A and C respectively. The accompanying diagram shows by way of example the apparatus required for carrying out the operations; this diagram shows a continuous pressing device 1, connected to an hydraulic press 1', an autoclave or digester 2 for the reception of the juice and the crushed residue, a filter press 3, a drying chest 4 for drying the oil cakes obtained in the press 3 and communicating with an air ejector or steam ejector, a stamping device 5, a crusher 6 for reducing to powder the cakes obtained in the press 3, a digester 7 provided with a mixer or any other apparatus permitting of cold extraction by contact of the powder by petroleum spirit, a vacuum filter 8 for separating the powder by after extraction, a condenser 9 with refrigerator 9', a filter 10, an autoclave 11 for evaporation and a drying chest 11'.

The extraction is effected in the following manner; the tomato (fresh ripe fruit) or the fresh cabbage or a mixture of both are crushed in the continuous press 1. The juice flows into the autoclave 2 and the residue resulting from the pressing passes into the hydraulic press 1' where it is piled up by a narrow grating transformed into a paste. By means of a jet of water this paste is also sent into the autoclave 2. The water is added in the proportion of two volumes of water to one volume of paste or pulp. The juice and pulp are mixed in the autoclave 2 with a re-agent containing 80 grs. acetate of lead and 1 gr. acetate of copper per litre. With the two materials under consideration (tomato and cabbage) four litres of the re-agent are added to every ten litres of the mixture obtained by the crushing in the presses, present in the autoclave 2. An abundant precipitate is produced which, in addition to the proteic matters, contains sugared pigments, glucosides, etc., that is to say all the vitamine A contained in the vegetable. The precipitation is completed with the quantity of re-agent indicated not only as regards the cabbage but also as regards the tomato. After the separation of the cakes in the filter press 3 and washing them in water, the cakes are dried in the drying press 4, in a vacuum of from 7 to 10 mm. approximately, at a temperature of 50° C. After desiccation there is obtained both in the case of the cabbage as well as in the case of the tomato, from 2 to about 2½ kgs. of dried substance per hundred litres of initial vegetable juice. After desiccation the cakes are broken up and crushed to a fine powder in a breaking and crushing machine (5 and 6) of the current type employed for industrial purposes. The powder thus obtained is extracted by a hyposolvent, preferably petroleum ether in the autoclave 7 provided with a mixing mechanism. The extraction of the vitamine A is effected very easily by the cold process. Use is made of about one litre of petroleum ether to each kg. of powder. After filtration in the vacuum filter it is washed on the filter by two litres of petroleum ether. During the course of the washing it is verified with the aid of the Bezssonoff re-agent and others by the reactions special to vitamine A if the extraction has been completed.

It should be noted that the chlorophyl remains entirely in the precipitate, whilst only a part of the lycopine (present in the case of the tomato) passes into the filter.

The petroleum ether containing the vitamine A is concentrated in vacuum in the autoclave 9 up to tenth of its volume. The liquid is afterwards introduced after passing through the filter 10, either into the vaporizing autoclave 11 or into the drying chest 11'. The filter 10 is employed to free the liquid concentrated in the digester 9 from any deposits of fatty bodies in suspension which are formed during the course of the evaporation.

If it be desired to dilute the preparation the liquid is introduced into the digester 11 then mixed with a suitable vegetable oil, such for instance as ground nut oil, olive or other oil, the oil acting as a solvent for the vitamine.

After evaporation of the petroleum ether contained in the mixture of oil and ether in a vacuum of approximately 8 mm. the preparation will be in a liquid state, without the fluidity of the oil being modified. If the liquid oil be replaced by an edible fat such as commercial margarine the preparation will be obtained in the solid state.

In order to obtain preparations highly concentrated in vitamine A, use is made of the drying chest 11' in this case no recourse is had to any dilution of the extract contained in the condenser 9. After evaporation of the petroleum ether there is obtained an orange coloured fatty body which remains solid at a temperature of 35° and which represents a solution of the vitamine A in the fatty bodies which accompany it. By this simple method, when working with the tomato, twenty times richer in vitamine A than the cabbage, there may be obtained preparations of very great richness in vitamine A. But if it be desired to approach the pure vitamine more closely, then rectifications must be made:

(1) By 99° methylic alcohol. The vitamine A is very soluble in this alcohol and the fatty bodies which accompany it are much less;

(2) By saponification with alcoholic potash. The fats accompanying the vitamine in the cabbage and the tomato are saponifiable and it is a very well established fact that the vitamine is not.

When operating with protection against oxidation it is possible, by this means, to separate the vitamine A from the saponifiable fats which accompany it. Finally the orange-brown pigment which accompanies the vitamine can be eliminated by repeated filtrations through animal charcoal. These highly rectified preparations although not presenting all their interests except in special cases, being nevertheless very concentrated products obtained by the industrial process described with reference to the apparatus 11 and 11' will satisfy all requirements of alimentary hygiene.

The presence of the vitamine A in the preparations described may be easily controlled:

(1) By special tests on animals,
(2) By the characteristic reactions of vitamine A, for instance the classic reaction with sulphuric acid, the Drummond reaction (with methyl sulphate the Bezssonoff reaction with mono-phosphomolybdotungstic acid).

I claim:

The process of obtaining vitamine A, the antixerophthalmic or lipo-soluble factor, which comprises mechanically separating the juices of green vegetables, finely crushing the residue from said mechanical separation mixing said crushed residue with said juices, precipitating the mixture of residue and juices by the addition thereto of a reagent containing lead acetate, drying the precipitated material in vacuo at the temperature of about 50° C., crushing the dried material into the form of powder. extracting said material by repeated washing with petroleum ether, concentrating the extract in vacuo, filtrating said concentrated extract, evaporating the petroleum ether from the filtrate, and finally rectifying the product resulting from this evaporation by means of methyl alcohol, all of said operations being carried out in the absence of oxygen.

In testimony whereof I affix my signature.

LEVON ARAKEL AGOPIAN.